United States Patent [19]

Warren et al.

[11] 4,016,234
[45] Apr. 5, 1977

[54] PAPER-BACKED ACOUSTICAL TILE

[75] Inventors: Herbert L. Warren, Arlington Heights; Bruce A. Wittrup, Hoffman Estates, both of Ill.

[73] Assignee: United States Gypsum Company, Chicago, Ill.

[22] Filed: June 20, 1975

[21] Appl. No.: 588,924

Related U.S. Application Data

[62] Division of Ser. No. 471,392, May 20, 1974.

[52] U.S. Cl. .............................. 264/129; 181/33 G; 181/33 GA; 264/86; 264/212
[51] Int. Cl.² .................................................. E04B 1/74
[58] Field of Search ................. 264/129, 212, 86; 181/33 G, 33 GA

[56] References Cited

UNITED STATES PATENTS

| 1,769,519 | 7/1930 | King et al. | 264/86 |
| 3,151,700 | 10/1964 | Feid | 181/33 G |
| 3,183,996 | 5/1965 | Capaul | 181/33 G |
| 3,480,104 | 11/1969 | Austin et al. | 181/33 G |
| 3,770,577 | 11/1973 | Humphrey | 181/33 G |

Primary Examiner—Robert F. White
Assistant Examiner—John Parrish
Attorney, Agent, or Firm—Samuel Kurlandsky; Donnie Rudd; Robert H. Robinson

[57] ABSTRACT

An acoustical tile comprising a relatively thin, flat body of acoustical composition including fibrous material and a binder, and a paper backing affixed thereto having a fire-retardant material dispersed therein, the outer facing surface of the tile being either planar or slightly convex.

4 Claims, 3 Drawing Figures

PAPER-BACKED ACOUSTICAL TILE

This is a divisional of application Ser. No. 471,392, filed May 20, 1974.

BACKGROUND OF THE INVENTION

1. Field of Invention

The present invention relates to building materials, and is more particularly concerned with acoustical tile suitable for use in ceiling structures having good acoustical properties, good fire retardance, and being free of undesirable warping.

2. Prior Art

Acoustical tile for use in sound absorbing ceilings has found wide use in the industry. U.S. Pat. No. 1,769,519 discloses such an acoustical tile which, according to its teachings, is formed of a mixture of granulated mineral wool, fillers, certain coloring materials, if needed, and a binder, particularly one of an amylaceous nature, such as thick boiling starch. This mixture or composition is placed upon suitable trays which have been previously covered with paper, such as newsprint, and then screeded to a suitable thickness with a reciprocating edge. A pleasing surface, including elongated fissures, resembling that of travertine stone is normally obtained. Alternatively, by screeding in a different manner the surface can be made without the fissures. The trays are then placed in an oven, and dried or cured. The dried sheets, called slabs, are removed from the mold, and dressed on both faces to provide smooth surfaces, to obtain the desired thickness and to prevent warping, and are then cut into tiles of a desired size.

Previous to this invention it had been assumed by those skilled in this art that for maximum drying speed the moisture should leave from both the bottom and the top surfaces of the drying slab and that covering the bottom surface with an impervious lamina would increase the drying time. Accordingly, the tray bottoms were made of foraminous material and covered with thin, relatively unsized layers of paper so as to facilitate the passage of water out of the back surface of the tile through the paper. Drying the composition under these conditions resulted in migration of the starch to both the bottom and top surfaces where it strengthened the surface areas. During the dressing operation, the face surface of the slab was normally sanded off to obtain a pleasant smooth surface, thereby removing a portion of the face area of high starch concentration. The resulting tiles were found to warp unless the corresponding back surface area of high starch content was also sanded off. Thus, the back surface of the slabs was dressed by sanding off the paper and a portion of the hardened composition to compensate for sanding of the other (face) side. Sanding the paper back on conventional tiles is also required to pass the E-84 flame spread test, and is at least as important as avoiding warping.

Removing the back surface of the slabs in the aforenoted process is not only a time-consuming and costly operation but also results in the loss of the paper and part of the cured composition, thereby necessitating the use and curing of extra material in initially forming the slabs.

In U.S. Pat. No. 3,307,651 there is disclosed an acoustical tile of the type described having an aluminum foil backing. Such a tile has improved fire-retardance properties and acoustical properties. Additionally, the aluminum backing serves to release the finished tiles from the trays in which they are formed. Additionally, this tile exhibits excellent sound attenuation properties, that is, it prevents to a high degree sound from passing through the tile. However, this tile has exhibited a significant adverse property. When the face surface of the tile is subsequently painted with a finishing material such as paint and the material dried, this causes the tile to warp, with the face of the tile becoming concave. This effect is also known as cupping or lipping. The undesirable feature of this condition is that when any kind of grazing light strikes the face of a tile having a concave surface, the edges of the tile are accentuated, and in the more aggravated condition the edges may actually form ridges in exaggerated form or even stand out from adjacent tiles. In the case of standard tile not having an aluminum foil backing, this condition is prevented by wetting the back surface with water simultaneously with the painting and drying operation. This completely eliminates the problem. However, such tiles have inferior acoustical sound attenuating properties.

SUMMARY OF THE INVENTION

Accordingly, it is an object of the present invention to provide an acoustical tile having good acoustical properties such as noise reduction coefficient and sound transmission coefficient.

It is another object of the invention to provide an acoustical tile having good fire-retardance.

It is still another object to provide an acoustical tile having an outer face which is not concave but which may be either flat or slightly convex.

It is still another object of the invention to provide a tile which may be readily released from the tray in which it is formed, and which does not require sanding off of a portion of the back thereof thereby suffereing a loss in thickness of the tile.

Still further objects of the invention will appear from the description and drawing.

According to the invention, an acoustical tile is provided formed of a fibrous material such as mineral wool and a binder, and having a paper backing affixed thereto which has been treated with a fire-retardant composition. The paper backing improves the acoustical properties, improves fireretardance, and permits the back wetting of the tile when the face of the tile is coated with a decorative coating material, thereby preventing the tile from warping in a dried condition in which the face surface of the tile might become concave.

DESCRIPTION OF THE PREFERRED EMBODIMENT

Figure 1:
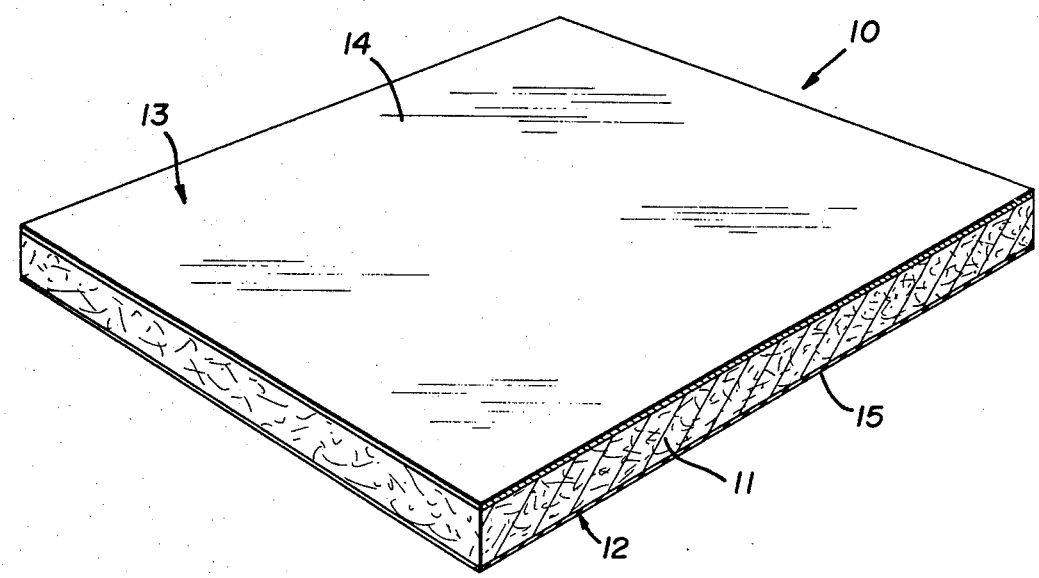
FIG. 1 is a perspective view showing an acoustical tile according to the invention.
Figure 3:
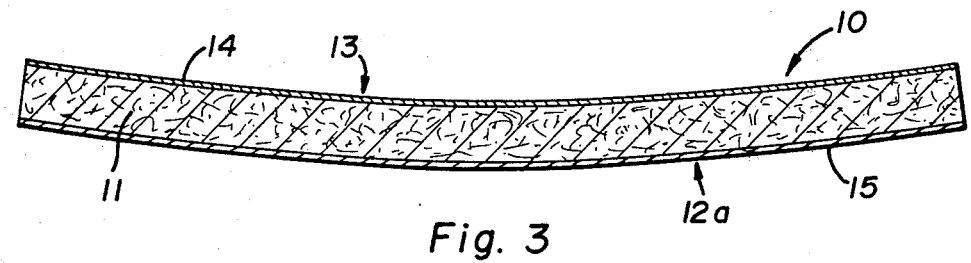
FIG. 3 is a cross-sectional view showing a tile according to the invention which has been treated with a protective coating on the face and wherein the back surface of the tile has been back wetted with water, and the two surfaces having been permitted to dry at the same time.

Referring to FIGS. 1 and 3, an acoustical tile 10 is shown having a body 11 formed of mineral wool and a binder and other conventional fillers and additives, and having a face surface 12 and a back surface 13. The back surface 13 has a fire-retardant paper backing affixed thereto, and the face surface 12 has a protective coating 15 of a material such as paint applied thereto.

When the protective coating 15 is applied to the acoustical tile 10 shown in FIG. 1, and when the coating dries, it shrinks and causes warping of the tile so that the face surface having the paint coating becomes concave, an undesirable condition. Consequently, at the same time that the protective coating is applied to the face surface, the paper backing 14 of the back surface 13 is wet with water, and subsequently dried with heat, causing the paper backing to shrink, and to oppose the shrinking force of the paint, thereby resulting in a substantially flat face surface. Alternatively, if desired, the paper backing 14 may be back wet to a sufficient degree so that the paper shrinks to a greater degree than the painted surface, causing a slight convexity on the face surface 12a of FIG. 3.

Figure 2:
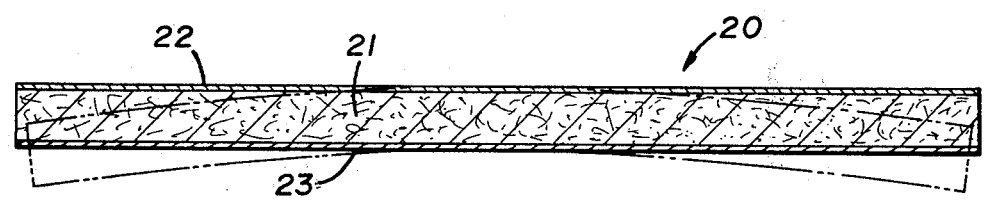
FIG. 2 is a sectional view of the tile according to the prior art having an aluminum foil backing, showing in broken lines the direction of warping when a paint coating is applied to the face of the tile and permitted to dry.

FIG. 2 shows an acoustical tile 20 of the prior art having a mineral wool body 21, an aluminum foil backing 22 affixed to the back surface, and a protective coating 23 applied to the face surface. Although this type of tile has good fire-retardance properties and good acoustical properties, because the aluminum foil is impervious to water, it does not permit back wetting. Consequently, when a paint coating is applied to the face surface, it causes the tile to warp as shown in the broken lines, thereby causing an undesirable concave surface on the face of the tile.

The following examples are provided for illustrative purposes only and are not to be considered in any way limiting.

EXAMPLE 1

Acoustical tiles according to the invention are prepared by lining a plurality of trays with a sheet of fire-retardant paper, utilizing Mosinee PS 1724 paper for one group of trays, and Head 3 P0 166 paper for another group. The paper is taken from rolls and spread evenly as continuous sheets over the lines of molds or trays.

An amylaceous binder-mineral fiber composition is formed by first preparing a starch binder from the following:

| | |
|---|---|
| Thick boiling starch, pounds | 259 |
| Calcium sulfate hemihydrate, pounds | 200 |
| Boric acid, pounds | 15 |
| Paraffin wax, pounds | 10 |
| Water, gallons | 595 |

The mixture is cooked at 180°–195° F. for 5 to 8 minutes and is then ready for use. Examples of presently available thick boiling starches are Corn Products Company's starch products 3123 and 3173 and A. E. Staley Manufacturing Company's starch product Sta-Thik.

Into a container are placed 135 gallons of the above starch binder and 250 pounds of granulated mineral wool, and mixed together for a total mixing time for the entire formulation of about 8 minutes to obtain an aqueous plastic mixture. The mixture is then placed in a feeder box and introduced into the trays in abutting end to end relationship, as the trays pass under the feeder box. The trays subsequently pass under a reciprocating screed bar driven by a motor which forms fissures on the face surface of the tiles. Subsequently a knife is passed between the trays to cut both the paper backing and mix. The trays then pass into an oven where the contents are dried and cured at temperatures of between 250° and 350° F. for 14 to 18 hours. The paper backing is now bonded to the tile composition.

The tiles are then removed from the trays to form into tiles of the desired size. The tiles are subsequently passed through a coating stage where they are sprayed with a protective coating such as a polyvinyl acetate latex paint, and simultaneously the paper backing is sprayed with water. The treated tiles are then dried, the shrinking of the paper coating counteracting the shrinking of the protective coated surface, and thereby preventing the face of the tile from acquiring a concave warp. If desired sufficient water may be applied to cause a slight convex warp on the face of the tile.

The fire retardant or resistant paper may be any of a large number known in the art. Generally such papers comprise cellulose fibers and a fire-retardant composition dispersed therein. The preferred paper is a kraft paper, although other forms of paper known in the art may be used. Among the fire-retardant fillers are those disclosed in U.S. Pat. Nos. 2,416,447, 3,202,567, and 3,770,577, the disclosures of which are incorporated herein by reference. Among such fire-retardant fillers which may be used are one or more of the following: zinc borate, antimony oxide, various organic hallide compositions, chlorinated paraffin, titanium dioxide, polyvinyl chloride, polyvinylidene chloride, chlorinated polyethylene, chlorinated diphenyls, various phosphorus compounds, and chlorinated polyester compounds. Mosinee PS 1724 is produced by the Mosinee Paper Company, Mosinee, Wis., and is formed of kraft paper having as a filler antimony oxide ($Sb_2O_3$) and vinyl chloride. Mead 3 PO 166 paper is produced by the Mead Corporation, Chillichothe, Ohio, and is formed of kraft paper and believed to have a filler of antimony oxide.

The fire-retardant filler, in order to be useful for the present invention, in addition to being fire-retardant must also be non-water-leachable upon the application of water to the paper. This may be accomplished by utilizing water-insoluble materials, or, where water-soluble materials are used, by coating the particles with a polymeric material such as an acrylic latex or a polyvinyl alcohol latex, and spray-drying the filler particles.

The fillers may be added during the formation of the fiber mix in the beater, or may be subsequently added as a sizing or coating material.

EXAMPLE 2

Fire hazard tests were conducted in accordance with UL Standard 723 (ASTM E-84). In preparation for the tests, acoustical tiles were prepared as described above in Example 1 utilizing for one test a tile having a paper backing of Mosinee PS 1724 fire-retardant paper, and in the second test a paper backing formed of Mead 3 PO 166, also known as fire-retardant kraft paper T-0166-A. In order to qualify under the existing Classification in Procedure R 3623, Vol. 1 or 2, Sec. 5, it is necessary that the tiles equal or better the fire hazard ratings of flame spread 15, fuel contributed 20, and smoke developed 0. Prior to the tests, the papers were cut down the middle of the tile with a razor blade and the paper surface exposed to the igniting flame. Results of the tests are shown below in Table I.

TABLE I

| Paper Backing Samples | Flame Spread | Fuel Contributed | Smoke Developed |
|---|---|---|---|
| Mosinee PS 1724 | 5.1 | 8.1 | 2.0 |
| Mead 3 PO 166 | 7.7 | 12.8 | 0 |

As can be seen, acoustical tile according to the invention met or exceeded all requirements. The smoking of the Mosinee paper backing tile was subsequently corrected by substituting a different protective coating.

EXAMPLE 3

Tests were carried out to determine the acoustical properties of tiles according to the invention, as produced in Example 1 utilizing a tile having a backing of Mosinee PS 1724 paper, as compared with prior art tiles utilizing an aluminum foil backing. The test used was the standard Ceiling Sound Transmission Test by the two-room method in accordance with Acoustical Materials Association "Standardized Mountings for Ceiling Sound Transmission Tests by the Two-Room Method" of July, 1964. In carrying out the test two 10 × 14 feet suspended ceilings with communicating 30 inches-deep plenum over STC 61 partition were utilized. In each case the ceilings were formed of ¾ × 12 × 12 inches tile, the tile of the invention having a fire-retardant paper backing according to Example 1, and the prior art tile having an aluminum foil backing. In each case the tiles were provided with a square edge, kerfed and rabbeted, and installed in AMA Standard Suspension No. ICF. The tests were carried out by measuring sound transmission to determine the Normalized Attenuation Factor (NAF) in decibels (dB) at frequencies in inervals of one-third octave according to the procedure designated as AMA-I-II-1967. In Table II, column A lists the results obtained from testing tiles according to the invention as prepared in Example 1, whereas the results shown in Column B are of tests carried out on prior art high grade aluminum foil-backed tile.

TABLE II

| f(Hz) | NAF A | NAF B |
|---|---|---|
| 125 | 32 | 31 |
| 160 | 39 | 40 |
| 200 | 38 | 36 |
| 250 | 32 | 30 |
| 315 | 33 | 30 |
| 400 | 35 | 33 |
| 500 | 37 | 34 |
| 630 | 38 | 35 |
| 800 | 39 | 37 |
| 1000 | 40 | 39 |
| 1250 | 43 | 42 |
| 1600 | 47 | 47 |
| 2000 | 53 | 53 |
| 2500 | 53 | 54 |
| 3150 | 56 | 57 |
| 4000 | 59 | 59 |

From the data above the ceiling Sound Transmission Class (STC) was determined per ASTM Designation E413-70T as follows:

| Acoustical Tile | STC |
|---|---|
| A | 41 |
| B | 39 |
| C | 34 |

The results of the tests as determined in the STC ratings show that both the paper backed tile of the invention (A) and the prior art aluminum foil backed tile (B) have excellent sound attenuation properties and place both of the tiles in the 40–44 STC classification, whereas the prior art tile (C) representing a tile in which the temporary paper backing was subsequently sanded off and which had been previously tested had an STC value of 35, placing it in the lower 35–39 STC classification.

The acoustical tile of the present invention with a fire-retardant paper backing has a number of advantages over prior art tiles. The presence of the paper backing acts as a mold release to permit the tiles to be removed from the trays in which they are formed. Because the paper backing is fire-retardant, it need not be removed by sanding the back surface, a step which is necessary when non-fire-retardant papers are used. Because this step is eliminated, the accompnaying loss of material is avoided, and therefore less starting material need be used to form the tiles. The paper coating accomplishes a high degree of reduction in sound transmission, rendering the tile far superior to conventional tiles having a sanded backing surface, and exhibiting such acoustical properties equal to the acoustically excellent aluminum foil-backed acoustical tiles. The tiles of the present invention have an advantage over aluminum foil-backed acoustical tile in that they permit wet-backing of the tile during the application of a protective coating on the face surface, thereby preventing concave warping or "lipping" of the face surface of the tile as generally occurs in the case of aluminum foil-backed tile. The present tiles are competitive with regard to cost and are readily fabricated by normal procedures and equipment.

It is to be understood that the invention is not to be limited to the exact details of operation or structure shown and described in the specification and drawing, since obvious modifications and equivalents will be readily apparent to one skilled in the art.

We claim:
1. A method for forming an acoustical tile, which comprises forming an aqueous slurry of mineral wool fibers and a binder, depositing the slurry on a paper sheet-form member, said paper sheet-form member being water absorbent, having good sound attenuation properties, and having a non-water-leachable fire-retardant material associated therewith in an amount sufficient to render said paper sheet-form member fire-retardant, drying said slurry and said sheet-form member to form a laminated structure having a mineral wool body with back surface and a face surface and with said paper sheetform member uniformly affixed and substantially coextensive with the entire back surface of said body, applying a protective coating on the face surface of said body and applying water on the paper sheet-form member, and concurrently drying said protective coating and said paper sheet-form member to form a coated acoustical tile wherein said mineral wool constitutes a major proportion by weight of said tile and wherein said coated face surface is free of concave warp.

2. A method according to claim 1, wherein said protective coating is a latex paint.

3. A method according to claim 1, wherein said fire-retardant material comprises antimony oxide.

4. A method according to claim 1, wherein said sheet-form member is kraft paper.

* * * * *

UNITED STATES PATENT OFFICE
CERTIFICATE OF CORRECTION

Patent No. 4,016,234    Dated April 5, 1977

Inventor(s) Herbert L. Warren and Bruce A. Wittrup

It is certified that error appears in the above-identified patent and that said Letters Patent are hereby corrected as shown below:

Column 3, line 45, "Head" should read -- Mead --.
Column 3, line 54, "259" should read -- 250 --.
Column 5, line 39, "inervals" should read -- intervals --.

Signed and Sealed this

Fourteenth Day of June 1977

[SEAL]

Attest:

RUTH C. MASON
Attesting Officer

C. MARSHALL DANN
Commissioner of Patents and Trademarks